United States Patent

Grosseau

[15] 3,672,240
[45] June 27, 1972

[54] HAND BRAKES IN MOTOR VEHICLES

[72] Inventor: Albert A. G. Grosseau, Chaville, France
[73] Assignee: Societe Anonyme Automobiles Citroen, Paris, France
[22] Filed: Jan. 15, 1970
[21] Appl. No.: 3,018

[30] Foreign Application Priority Data

Jan. 22, 1969 France....................6901111

[52] U.S. Cl............................74/503, 74/543
[51] Int. Cl.....................................G05g 1/10
[58] Field of Search...........................74/503, 543

[56] References Cited

UNITED STATES PATENTS

| | | | |
|---|---|---|---|
| 2,158,323 | 5/1939 | Ericson et al. | 74/503 |
| 2,205,987 | 6/1940 | McCarthy | 74/503 |
| 2,650,835 | 9/1953 | Gonsett | 74/503 X |
| 3,473,403 | 10/1969 | Biro | 74/503 X |

Primary Examiner—William F. O'Dea
Assistant Examiner—F. D. Shoemaker
Attorney—Ward, McElhannon, Brooks & Fitzpatrick

[57] ABSTRACT

A device for controlling the brakes of a vehicle including a handle mounted in a housing in the dashboard such that its outer surface is flush with the dashboard when the handle is in one position of operation.

4 Claims, 2 Drawing Figures

HAND BRAKES IN MOTOR VEHICLES

A variety of arrangements have been made heretofore concerning the location of the handle for operating the hand brake of motor vehicles.

One of these arrangements, which is particularly favorable from the point of view of safety, consists in moving the handle away from the central zone of the vehicle, locating it near one of the sides of the vehicle, i.e. on the left for vehicles with left-hand drive, and on the right for vehicles with right-hand drive. In this way, the handle is out of reach of passengers, allows easy control from the outside of the vehicle and, of course, relieves congestion in the central space inside the vehicle.

It has now been found that recent modifications in motor car development, particularly those concerning safety, have raised new questions, the solutions to which make the arrangement of the handle described hereinabove less advantageous than before. Thus, the general use of safety belts comprising three points of attachment has limited the mobility of the driver. In particular, after having buckled his safety belt, he finds it practically impossible to move his shoulder nearest the outside of the vehicle and therefore to reach the brake handle, since two of the three points of attachment of the belt are arranged on at least one of the side elements of the interior of the vehicle.

Accordingly, we have been prompted by this state of affairs to reconsider the known arrangements and to envisage disposition of the handle on the side of the driver's shoulder which remains partly mobile, i.e. on the side of the shoulder located in the central zone of the vehicle. The new arrangement therefore consists in disposing the handle in the dashboard of the vehicle and preferably in the central zone thereof, thus contributing an overall structure which eliminates the risks involved prior to the invention.

The present invention therefore has for its object a device for controlling the hand brake of a motor vehicle, comprising a maneuvring handle connected through a control rod to the brakes, and cooperating with a member for locking it in braking position. The shape of the handle is configured in a housing formed in the dashboard so as to be embedded therein when in the release position, said dashboard being disengaged in the vicinity of the prehension zone of the handle.

In an advantageous embodiment of the invention, the section of the handle is substantially identical to that of a fillet, which is mounted in two parts on the dashboard, on either side of the handle in brake release position.

Moreover, it is advantageous if the handle supports a lever for controlling the locking member in the prehension zone of the handle.

The invention will be described in greater detail with reference to the accompanying drawings, in which.

Figure 1:
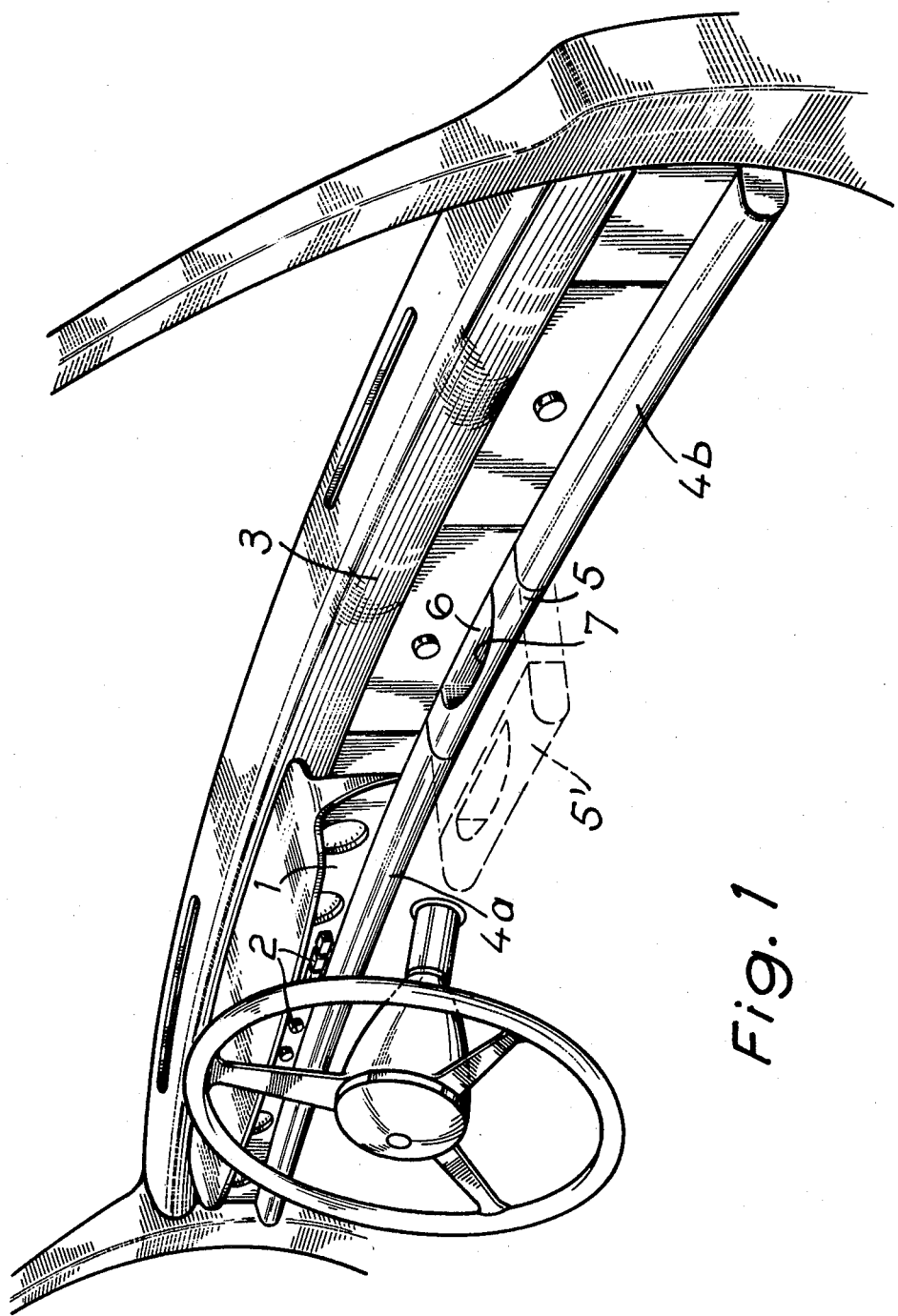
FIG. 1 is a perspective view of the front part of the interior of a vehicle provided with a device for controlling the hand brake in accordance with the invention.

Referring now to the drawing, FIG. 1 shows the dashboard 1 of a vehicle comprising instruments 2. This dashboard is advantageously provided with fillets such as the upper fillet 3 and/or the lower fillet composed of two parts 4a and 4b. In the central zone of the dashboard 1, interposed between parts 4a and 4b of the lower fillet, so as to ensure a substantial continuity of the shape of said fillet, is arranged the handle 5 for operating the hand brake. The handle is shown at 5, in solid lines, in the position corresponding to the inoperative or brake release, position, and at 5', in broken lines, in the position corresponding to the braking of the vehicle.

Figure 2:
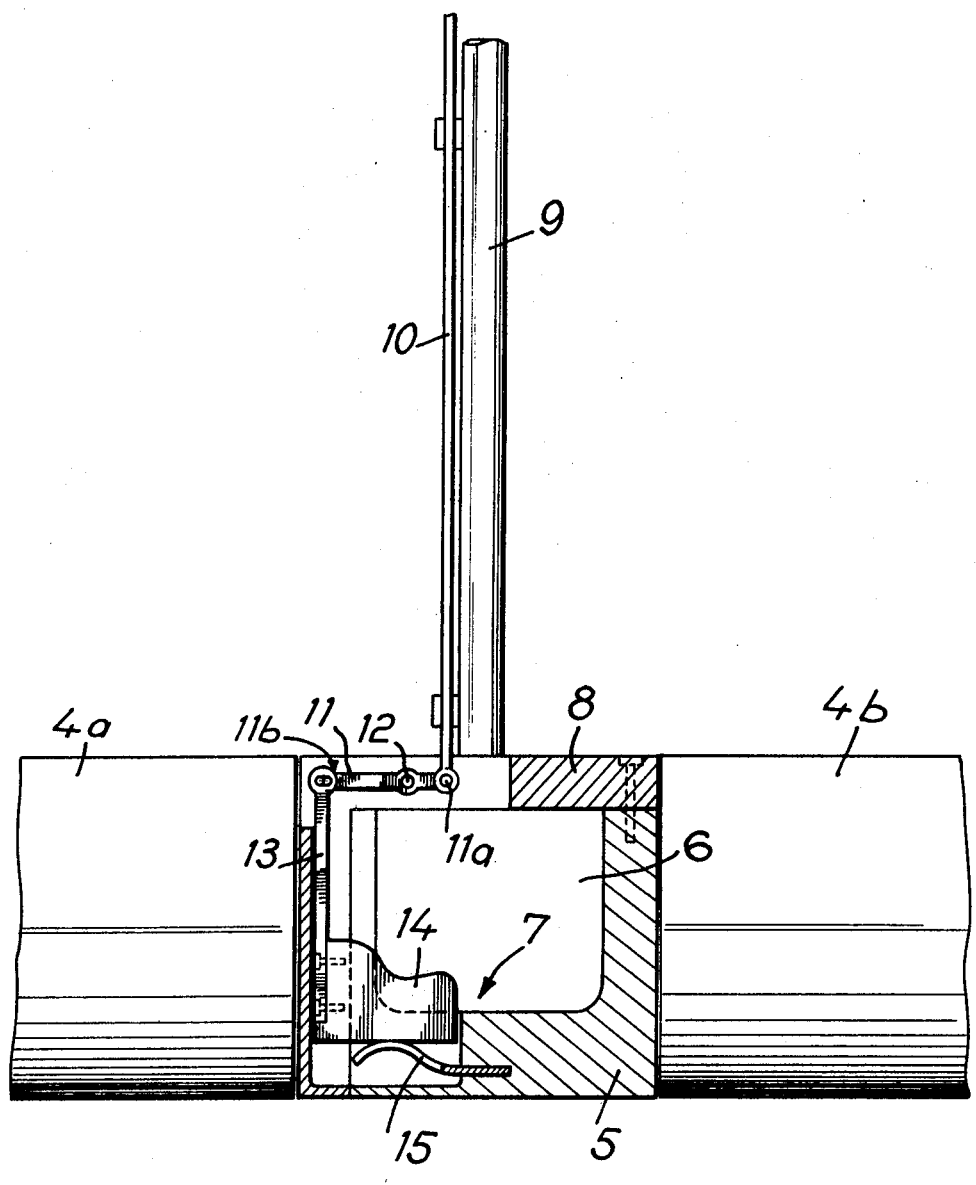
FIG. 2 is a view, partly in section and partly in plan, of a device for controlling the hand brake, according to the invention.

FIG. 2 illustrates a detail of this embodiment, showing parts 4a and 4b of the lower fillet, and the handle 5. This handle comprises more especially a recess 6, a prehension zone 7 and a rear part 8 opposite the prehension zone. This rear part 8 is unitary with the control rod 9 of the hand brake. A brake gear 10 for locking the brake is advantageously connected to the handle 5 by means of a lever 11 articulated to the rear part 8 about an axis 12. The end 11a of the lever is fixed to the brake gear 10, while the end 11b of the same lever is articulated to a plate 13 mounted to slide in the handle. The axis 12 is arranged between the ends 11a and 11b. A trigger 14 is disposed in the prehension zone 7 and is integral with the plate 13. A return spring 15 holds the trigger 14 in a certain position from which it may be removed by being pulled in the direction opposite that of the action of the spring 15.

It will have been noted, particularly with reference to FIG. 1, that the access to the recess 6 of the handle 5 and therefore to the prehension zone 7 has been facilitated by grouping the instruments 2 in a zone of the dashboard other than that where the handle 5, is located. In other words, the dashboard 1 has been judiciously cleared of instruments and the like in the vicinity of the prehension zone 7.

The advantages adhieved by the above-described arrangement of a device according to the invention are several.

Firstly, the driver may maneuver the hand brake by pulling the handle 5 on the side of his body which remains partially mobile, even after his safety belt has been fastened.

The drawback constituted by the bulk in the central space of the dashboard is completely eliminated, since the handle 5 is integrated, when the brake is in inoperative position, with the dashboard 1 itself, or with the fillet 4a, 4b unitary with said dashboard 1. In this position, the handle 5 has no dangerous projecting part, this further increasing the safety of the vehicle.

Moreover, it will be noted that the continuity in the shape of the fillet 4a, 4b and handle 5 contributes to the aesthetics of the dashboard 1.

The marking of the braking position will also be noted, this being perfectly ensured since, when the handle is located at 5', it is disengaged very visibly from the fillet 4a, 4b.

The invention is not limited to the embodiment which has just been described. It covers on the contrary all the modifications that may be made thereto, without departing from the scope thereof. In particular, the device may be adapted to a right-hand drive car.

What is claimed is:

1. A device for controlling the handbrake of a vehicle having a dashboard formed with fillet means, which comprises: an operating handle connected to vehicle braking means and means for locking said braking means in braking position, said handle being adapted to occupy at least two distinct positions corresponding respectively to complete application and complete release of said braking means; a housing mounted in said dashboard emerging in the surface thereof through an opening in said fillet means, said handle when in one of said positions being contained in said housing and being configured so that its outer surface is flush with said fillet means, and said handle being at least partially projected from said dashboard when in another of said positions.

2. A device according to claim 1, characterized in that said housing interrupts said fillet means.

3. A device according to claim 1, wherein said handle comprises a gripping area constructed and arranged to be positioned within said housing when said handle is in one of said positions, and a control member, constituting part of said means for locking the braking means is attached to said handle in such manner as to also be positioned within said housing when said handle is in one of said positions.

4. A device according to claim 3 wherein said control member is a lock release trigger attached to said handle for actuation by an operator in the act of prehension of said handle.

* * * * *